United States Patent Office

3,445,535
Patented May 20, 1969

3,445,535
METHOD FOR SEPARATION OF DIVINYL-
BENZENE ISOMERS FROM HYDROCARBON
MIXTURE
Eduard Pavlovich Gendrikov, Ul. Schorsa, 61, kv. 63;
Vsevolod Dmitrievich Enalev, Bulvar Pushkina, 12, kv.
70; and Galina Vladimirovna Samoilenko, Petrovskoe
shosse, 1, kv. 8, all of Donetsk, U.S.S.R.
No Drawing. Filed May 3, 1966, Ser. No. 547,156
Int. Cl. C07c 7/16, 15/10
U.S. Cl. 260—669                                  6 Claims

ABSTRACT OF THE DISCLOSURE

A method for separating divinylbenzene isomers from a hydrocarbon mixture by treating same with a cuprous salt mixed with aqueous ammonium chloride to form cuprous complexes of the divinylbenzene isomers and after separating the complexes from the reaction mixture, decomposing said complexes into the respective isomers and the cuprous salt.

---

This invention relates to methods for isolating the isomers of divinylbenzene from hydrocarbon mixtures.

There is known a method for the isolation of divinylbenzene isomers from a hydrocarbon mixture, wherein said mixture is treated with a cuprous salt to form a complex followed by separating and decomposing the thus obtained complex.

Said prior art method suffers from the disadvantage of being ineffective when the starting hydrocarbon mixture is comprised of a product obtained by the catalytic dehydrogenation of diethylbenzenes, since said product generally contains less than 20% of divinylbenzene isomers and yields no complex with cuprous salts.

It is, therefore, necessary to subject the product of the catalytic dehydrogenation of diethylbenzenes to high-vacuum rectification for the purpose of increasing the percentage of divinylbenzene isomers.

Moreover, since the treatment of a hydrocarbon mixture with cuprous chloride results in the formation of solid complexes of divinylbenzenes with cuprous chloride, the removal of said solid complexes from a reactor, the comminution of solid complexes and separation of uncomplexed impurities by washing are difficult to perform.

A further disadvantage of the prior art method is that upon separation and washing, said solid complexes must be used in the form of suspension to effect their thermal decomposition. In the suspension, the dispersive medium consists of the solvent which has been previously used for washing the solid complexes. Thermal decomposition yields a mixture of divinylbenzene isomers with said solvent, so that distillation is necessary in order to remove the solvent.

An additional disadvantage of the prior art method arises from the fact that said method does not make it possible to separate the mixture of divinylbenzenes into its component parts, viz., 1,3-divinylbenzene and 1,4-divinylbenzene.

It is an object of the present invention to provide a method for the separation of divinylbenzene isomers from a hydrocarbon mixture which will make possible the utilization of a product of catalytic dehydrogenation of ethylbenzenes as the starting mixture without subjecting said product to any preliminary treatment.

It is another object of the present invention to provide a method for the separation of divinylbenzenes from a hydrocarbon mixture which makes it possible to obtain finely dispersed complexes of divinylbenzene isomers with cuprous chloride.

It is a further object of the present invention to provide the possibility of effecting thermal decomposition of the complexes into isomers in an aqueous suspension.

It is an additional object of the present invention to separate the mixture of divinylbenzene isomers into the individual divinylbenzene isomers.

In accordance with these and other objects, the separation of divinylbenzene isomers from a hydrocarbon mixture is effected by treating said mixture with a cuprous salt, preferably cuprous chloride, mixed with a solution of ammonium chloride.

It is preferred to treat the hydrocarbon mixture while gradually lowering the temperature from 20° C. to −15° C., preferably from 10 C. to −5° C., and to separate the thus obtained mixture of divinylbenzene isomers into its individual isomers by subjecting said mixture to additional treatment with a cuprous salt mixed with a solution of ammonium chloride, said treatment resulting in the isolation of 1,4-divinylbenzene in the form of a cuprous complex which is subsequently decomposed, whereas 1,3-divinylbenzene remains in the residue.

The hydrocarbon mixture can likewise be treated at a temperature of from 5 to 30° C., preferably in the 15 to 20° C. temperature range, to obtain a cuprous complex of 1,4-divinylbenzene, while the residue is treated with a cuprous salt mixed with a solution of ammonium chloride at a temperature of from 5 to −10° C., preferably from 3 to −5° C., with a view to preparing a cuprous complex of 1,3-divinylbenzene which is separated and thereafter decomposed.

The procedure is described hereinbelow. Ammonium chloride (0.1–1.0 gam mol) is dissolved in water (6–30 gram mols) and to the solution is added cuprous chloride (0.1–0.7 gram mol), with stirring in an atmosphere of nitrogen, until the cuprous chloride ceases to dissolve.

When the mode of operation involves separation of divinylbenzene isomers from a hydrocarbon mixture and isolation of separate isomers the procedure is as follows:

To the mixture of aqueous ammonium chloride and cuprous chloride prepared as specified hereinabove there is added a hydrocarbon mixture which is cooled to a temperature of 3–7° C. and which contains divinylbenzene isomers is an amount of 0.2–2 gram mols per gram mol of cuprous chloride. Also added to the mixture is a vinyl polymerization inhibitor.

The reaction mixture is stirred for 15 min., while maintaining the temperature at 8–20°, preferably at 9–11° C., and then seeded with the 1,3-divinylbenzene cuprous chloride complex in an amount of 0.05 g. per 100 g. of the hydrocarbon mixture. Stirring of the reaction mixture is continued for another 30–40 min., while maintained said temperature, followed by lowering the temperature to 0±1° C. and thereafter stirring the reaction mixture for 0.5–1 hr. Then the reaction mixture is allowed to stand for a period of 2–15 hours at a temperature of −15° C., preferably at −4 or −5° C. The next step consists in adding, with stirring, a dilute inorganic acid, such as hydrochloric acid, to the reaction mass until it is acid to Congo red, followed by sucking off the precipitate comprising the complex of divinylbenzene isomers with cuprous chloride, washing said precipitate on the filter with dilute hydrochloric acid, transferring the washed precipitate into a vessel, and washing said precipitate, with thorough stirring, in a water-miscible solvent, for example, methanol.

Then the precipitate is sucked off, transferred again from the filter into said vessel, thoroughly stirred in methanol, sucked off once more, and washed on the filter with water.

The precipitate, washed in the manner described hereinabove is placed in a distillation apparatus and treated with live steam in order to distil off the isomers of divinylbenzene.

The condensate forms two layers, viz., an upper layer comprised of divinylbenzene isomers, and a lower aqueous layer. To separate the layers, use is made of a separatory funnel.

The thus obtained mixture of divinylbenzene isomers can be separated into the individual isomers in the manner described below.

The mixture of aqueous ammonium chloride and cuprous chloride prepared by following the procedure presented hereinabove, is used to treat the mixture of divinylbenzene isomers at a temperature of 10 to 30° C., preferably at 20° C., for a period of 15–20 minutes, whereupon the treated mixture is allowed to stand for 1–3 hours at the temperature specified above. Then a precipitate of 1,4-divinylbenzene-cuprous chloride complex formed is separated, washed and decomposed with live steam in the manner disclosed hereinabove.

The filtrate, and the acidic methanol and aqueous washings are combined, thoroughly mixed with an equal or somewhat smaller volume of water, and the upper layer, viz., 1,3-divinylbenzene, is separated from the aqueous layer in a separatory funnel.

Where the 1,4- and 1,3-divinylbenzenes are to be separated consecutively from a hydrocarbon mixture, the procedure is as follows.

A mixture of aqueous ammonium chloride with cuprous chloride is prepared as disclosed hereinabove, and to the thus obtained solution is added a hydrocarbon mixture which contains divinylbenzene isomers and a vinyl polymerization inhibitor. The reaction mixture is stirred vigorously at a temperature of 5 to 30° C., preferably at 15–20° C., for a period of 15–20 minutes and allowed to stand for 1–20 hours at the same temperature.

The 1,4 - divinylbenzene - cuprous chloride complex which precipitates is separated, washed, and decomposed in accordance with the procedure described hereinabove. The filtrate and the acidic, methanol, and aqueous washings are combined, thoroughly mixed with an equal or somewhat smaller volume of water, and the upper layer, viz., the hydrocarbon mixture containing 1,3-divinylbenzene, is separated by means of a separatory funnel.

Said hydrocarbon mixture is treated with a fresh portion of aqueous ammonium chloride mixed with cuprous chloride with vigorous stirring for 15–20 minutes at a temperature of 5 to −10° C., preferably at 3 to −5° C. The reaction mixture is allowed to stand for a period of 1–20 hours at the temperature specified above.

The 1,3-divinylbenzene - cuprous chloride complex which precipitates from the reaction mixture is washed and decomposed with live steam as described above.

The complexes of the divinylbenzene isomers with cuprous chloride lend themselves to separation from water-hydrocarbon mixtures by filtration, centrifugation, and also by distilling off water and hydrocarbons under reduced pressure at temperatures below 30° C. In order to accelerate filtration, it is advantageous to add a small quantity of an inorganic acid to the complex suspended in the water-hydrocarbon mixture until said mixture is acid to Congo red.

It is preferred to wash the complexes of divinylbenzene isomers with cuprous chloride free from adsorbed hydrocarbons and residues of the cuprous salt and aqueous ammonium chloride mixture by means of a solvent which is miscible with water, for example, methanol.

The examples which follow illustrate the invention.

EXAMPLE 1

Into a reaction vessel fitted with a stirrer and stirrer seal, a thermometer, a dropping funnel, and a bubbler for feeding a stream of nitrogen, are placed 71.8 g. of cuprous chloride and 42.8 g. of ammonium chloride. Then the air is flushed from the reaction vessel by a nitrogen stream, the stirrer is set in operation, and 286 ml. of water is introduced into the reaction vessel through the dropping funnel.

Nitrogen is fed into the reaction vessel at a rate of ca. 10–20 bubbles per minute.

Stirring of the reaction vessel contents at 200–300 r.p.m. is continued for 15 min., during which period the cuprous chloride added is partly dissolved. Next 100 g. of the product of catalytic dehydrogenation of diethylbenzenes which contains 14.4% of divinylbenzene isomers is cooled to 5° C. and introduced into the reaction vessel. The reaction mixture in the atmosphere of nitrogen is stirred for 45 minutes at 9–10° C. and thereafter seeded with 0.05 g. of a 1,3-divinylbenzene-cuprous chloride complex. The temperature is lowered to 0° C., and at this temperature stirring of the reaction mass continues for 1 hour, followed by maintaining the reaction mass at a temperature of −4 to −5° C. for a period of 15 hours. After addition of 2.4 g. of concentrated hydrochloric acid, the reaction mass is stirred, and the complex of divinylbenzene isomers with cuprous chloride thus obtained is separated on a Buchner funnel.

The complex is washed on the filter with hydrochloric acid and then transferred into a baker where it is washed, with thorough mixing, twice with methanol.

There are obtained 65 g. of the complex of divinylbenzene isomers with cuprous chloride in the form of a crystalline, greenish powder which is insoluble in water and hydrocarbons, and sparingly soluble in alcohol.

To recover the mixture of divinylbenzene isomers from the complex, the latter is treated with live steam in a distillation apparatus, so that the mixture of divinylbenzene isomers distils off with the steam. Upon separation from the aqueous layer in a separatory funnel, the divinylbenzene isomer mixture is separated into individual isomers.

According to chromatographic analysis data, the crude product contains 31.2% of 1,4-divinylbenzene, 58.8% of 1,3-divinylbenzene, and 10% of other compounds.

The mixture of divinylbenzene isomers (20 g.) is separated into 1,4- and 1,3-divinylbenzenes by treatment with a mixture of cuprous chloride (14.6% of 95% cuprous chloride) and aqueous ammonia (13.9 g. of ammonium chloride+125 ml. of water) at a temperature of 20° C.

The reaction mixture is subjected to stirring at 18–20° C. for 0.5 hour and thereafter maintained at the same temperature for a period of 1 hour, and filtered on a Büchner funnel. The 1,4-divinylbenzene-cuprous chloride complex thus isolated is vigorously stirred and washed twice with methanol. Subsequent decomposition of the complex yields 95% of 1,4-divinylbenzene, 3% of the 1,3-isomer, and 2% of other compounds.

From the filtrate and also from the methanol washings diluted with water, the 1,3-divinylbenzene is separated in a separatory funnel as the upper layer. The crude 1,3-divinylbenzene thus obtained contains 85% of the desired isomer.

EXAMPLE 2

To 5.6 g. of ammonium chloride dissolved in 70 ml. of water are added 5.6 g. of cuprous chloride and the mixture is stirred for 15 minutes in an atmosphere of nitrogen.

To said mixture there are added, with stirring, 100 g. of the product of catalytic dehydrogenation of diethylbenzenes which contains 14.4% of divinylbenzene isomers, the reaction mixture is stirred for 15 minutes and allowed to stand for a preiod of 2 hours at 15° C.

Next there are added to the reaction mixture, with stirring, 4 ml. of dilute (1:1) hydrochloric acid, and the precipitate (the 1,4-divinylbenzene-cuprous chloride complex) is sucked off on a Büchner funnel, washed on the filter with dilute (1:20) hydrochloric acid, transferred to a beaker, washed twice with methanol, sucked dry on the Büchner funnel, and washed on the filter with water.

Decomposition of said complex yields 4.7 g. of 1,4-divinylbenzene (95% pure).

The filtrate and the acidic, methanol, and aqueous washings are combined in a separatory funnel, diluted with 50 ml. of water, and thoroughly mixed. The turbid mixture thus obtained is filtered and the upper layer is separated.

This layer is treated with a mixture composed of 43.8 g. of ammonium chloride, 43.8 g. of cuprous chloride, 560 ml. of water and 0.05 g. of the 1,3-divinylbenzene-cuprous chloride complex, by following the procedure disclosed in Example 1 with reference to the separation of the mixture of divinylbenzene isomers.

Upon separation and washing, the 1,3-divinylbenzene-cuprous chloride complex is decomposed with steam to yield 6.1 grams of 1,3-divinylbenzene of 95% purity.

Although the present invention has been described with reference to a preferred embodiment thereof, it will be readily understood by those skilled in the art that various changes and modifications can be resorted to without departing from the spirit and scope of the invention. These changes and modifications shall be considered as falling within the spirit and scope of the present invention as described hereinabove and defined in the appended claims.

What is claimed is:

1. A method for the seperation of divinylbenzene isomers from a hydrocarbon mixture, said method comprising treating a hydrocarbon mixture with a cuprous salt mixed with aqueous ammonium chloride, to form cuprous complexes of the divinylbenzene isomers, separating the cuprous complexes obtained, and decomposing said complexes into divinylbenzene isomers and the cuprous salt.

2. A method for the separation of divinylbenzene isomers from a hydrocarbon mixture, said method commprising treating a hydrocarbon mixture with a cuprous salt mixed with aqueous ammonium chloride, while gradually lowering the temperature from 20 to −15° C., to form cuprous complexes of the divinylbenzenes followed by separating the complex of divinylbenzene isomers with the cuprous salt, decomposing said complex into an isomer mixture and the cuprous salt, and separating said mixture of divinylbenzene isomers into individual isomers by treating same with an additional amount of said mixture of the cuprous salt and aqueous ammonium chloride, 1,4-divinylbenzene being isolated in the form of a cuprous complex, and 1,3-divinylbenzene remaining in the residue, and decomposing said complex into 1,4-divinylbenzene and the cuprous salt.

3. A method for the separation of divinylbenzene isomers from a hydrocarbon mixture, said method comprising treating a hydrocarbon mixture with a cuprous salt mixed with aqueous ammonium chloride at a temperature of 5 to 30° C. until a complex of 1,4-divinylbenzene with the cuprous salt is obtained, separating said cuprous complex of 1,4-divinylbenzene, decomposing said complex into 1,4-divinylbenzene and the cuprous salt and aqueous ammonium chloride at a temperature of 5 to −10° C., until a complex of 1,3-divinylbenzene with the cuprous salt is obtained, separating said complex of 1,3-divinylbenzene with the cuprous salt, and decomposing said complex into 1,3-divinylbenzene and the cuprous salt.

4. A method as claimed in claim 1, wherein the cuprous salt is cuprous chloride.

5. A method as claimed in claim 2, wherein the cuprous salt is cuprous chloride and the temperature is 10 to −5° C.

6. A method as claimed in claim 3, wherein the cuprous salt is cuprous chloride and the hydrocarbon mixture is treated with said cuprous chloride mixed with aqueous ammonium chloride at 15–20° C., and decomposing of the cuprous complex of 1,4-divinylbenzene is effected at a temperature of 3 to −5° C.

References Cited

UNITED STATES PATENTS

| | | | |
|---|---|---|---|
| 2,392,910 | 1/1946 | Franz | 260—669 |
| 2,973,394 | 2/1961 | Atkinson et al. | 260—669 |
| 3,217,051 | 11/1965 | Rubinstein et al. | 260—669 |
| 3,217,052 | 11/1965 | Meek et al. | 260—669 |

DELBERT E. GANTZ, *Primary Examiner.*

C. E. SPRESSER, *Assistant Examiner.*

U.S. Cl. X.R.

260—674